United States Patent [19]

Couch et al.

[11] Patent Number: 5,167,880

[45] Date of Patent: Dec. 1, 1992

US005167880A

[54] PHENOLIC-TRIAZINE RESIN FINISH OF CARBON FIBERS

[75] Inventors: Brian P. Couch, South Bend; Lawrence E. McAllister, Granger, both of Ind.

[73] Assignee: Allied-Signal Inc., Morristown, N.J.

[21] Appl. No.: 632,827

[22] Filed: Dec. 24, 1990

[51] Int. Cl.$^5$ .......................... B05D 3/10; B29C 35/08
[52] U.S. Cl. ........................................ 264/22; 264/83; 264/137; 427/340; 427/385.5; 427/399; 427/434.6; 427/443.2; 427/538
[58] Field of Search .................... 264/22, 26, 83, 29.2, 264/134, 137; 427/227, 340, 385.5, 434.6, 443.2, 38, 399

[56] References Cited

U.S. PATENT DOCUMENTS 3,796,624  3/1974  Avis et al. ............................ 156/436
4,588,538  5/1986  Chang et al. ........................ 264/29.2

*Primary Examiner*—Leo B. Tentoni
*Attorney, Agent, or Firm*—Leo H. McCormick, Jr.; Larry J. Palguta; Robert A. Walsh

[57] ABSTRACT

A method of finishing carbon fibers with phenolic triazine to promote adhesing of the carbon fibers with a resin matrix to retain up to 92% of the room temperature dry strength at a temperature of 500° F.

6 Claims, No Drawings

PHENOLIC-TRIAZINE RESIN FINISH OF CARBON FIBERS

This invention relates to a phenolic triazine finish for carbon fibers to improve interfacial bond strength between the carbon fibers and a resin matrix to produce a composites whose dry room temperature strength is essentially retained when the composite is exposed to temperatures of 500°–600° F. for extended periods of time.

In composite technology the strength of a resulting composite is influenced by the bond between the matrix and fiber reinforcement. During the manufacture of fibers, the fibers are normally surface treated to chemically activate the surface to promote interfacial bonding with the matrix resin. The treated fiber surface must be then surface finished with a sizing. The surface finish protects the activated fiber from contamination and damage due to storage, handling and subsequent operations such as prepegging and weaving. The surface finish (sizing) is selected to be physically and chemically compatible with the fiber surface and the matrix resin. It must also provide good interfacial bonding between the fiber and the matrix. In the use of carbon fibers, sizing or surface treatment must be applied to the fiber tow, which may consist of up to 12,000 filaments, to prevent the individual filaments from contact damage between themselves and against guides during weaving or winding to produce a composite. Unfortunately, the surface finish (sizing) may cause some of the filaments to bond together and prevent uniform impregnation of the tows by a resin matrix. As indicated above, commercially available carbon fibers for use in composites are typically surface treated during manufacture. This is usually accomplished by oxidation of the fiber surface to introduce chemically reactive and/or polar functional groups. Thereafter, a polymeric finish is applied to protect the treated fiber tow. When woven into fabric cloth or wound into a desired shape and impregnated with a resin, the polymeric finish must adhere to the fiber tow and be chemically compatible with a resulting matrix when the resin is cured. It has been our experience that composites made with commercially available carbon fibers performing adequately at room temperature but when exposed to temperatures between 500–600° F. these composites exhibit insufficient structural strength to meet specific operational requirements. The reduction in structural strength is attributed to a thermally unstable bond between the carbon fiber surface and the resin matrix.

Phenolic-triazine resins as disclosed in U.S. Pat. Nos. 4,831,086 and 4,970,276 are proven thermally stable modified resins derived by the cyclotrimerization of cyanate ester groups. These phenolic-triazine resins are distinguished by the following characteristics: high glass transition temperature, mechanical properties such as strength and stiffness equivalent to high performance polyimides and no generation of volatile by-products produced during curing.

We have discovered that finishing carbon fiber with phenolic triazine promotes adhesion of the carbon fiber with a resin matrix to produce a composite that retains approximately 92% of room temperature dry structural stability when exposed to temperatures of 500°–600° F. Our method of finishing carbon fibers includes the following steps: carbon fiber is transported through a first bath containing a solution of from 5–15% phenolic triazine in a solvent to disperse the phenolic triazine throughout the carbon fiber; and the phenolic triazine treated carbon fiber is forced air dried. In this condition, the treated carbon fiber can be stored or subjected to additional processing such as weaving, or it can be immediately transported through a second bath containing a solution of from 20–40% of phenolic triazine to create a preimpregnated carbon fiber wherein the weight of the phenolic triazine in the carbon fiber is between 30–50% of the preimpregnated carbon fiber. The preimpregnated carbon fiber can now be formed into a desired shape by various processing techniques such as filament winding or molding. After the shape of the composite is established, the phenolic triazine is cured in a circulating air oven, platen press or autoclave having a temperature of about 400° F. The carbon fiber in the resulting composite should comprise about 60% of the total volume of the composite. When compared to similar composites made with carbon fibers having other polymeric finishes, up to a 92% increase in shear strength and 25% increase in flexural strength was achieved through the use of this phenolic triazine finished carbon fiber and phenolic triazine resin matrix.

An advantage of this invention in which phenolic triazine resin is used as a surface finish for carbon fiber to improve interfacial fiber-matrix bonding in a composite, is the improved safety provided by the lack of volatile by-products during curing of the composite.

Another advantage of this invention is the improved bonding that occurs between carbon fiber and a resin matrix through the use of phenolic triazine resin as a surface finish for carbon fiber tow.

A still further advantage of this invention is the high temperature strength that is retained by the composite through the interfacial bond between the carbon fibers and resin matrix.

In this invention, commercially available carbon fiber having a nominal tensile strength of 730,000 psi and designated T-650/42 was purchased from Amoco Corporation. T-650/42 carbon fiber was selected as the carbon reinforcing fiber because of its high modulus, high tensile strength, thermo-oxidative stability and availability. The carbon fiber was purchased with an Amoco surface treatment and a urethane resin finish sold under the designation of UC322. The carbon fiber with this surface treatment and finish was used to make undirectional laminates by compression molding using phenolic triazine resin of the type disclosed in U.S. Pat. No. 4,831,086 as the matrix material to produce a first sample composite identified as Sample A. The carbon fiber volume was approximately 60% of the total composite. Resin dominated mechanical property tests were performed on Sample A specifically to evaluate the effectiveness of the fiber/resin interfacial bond. Flexural and short beam shear testing was carried out on Sample A at room temperature (68° F.), 500° F., and 600° F. These tests were performed both before and after isothermal aging. Flexural properties were tested according to a modified version of ASTM-D-790 using a four point bend fixture, a crosshead speed of 0.127 cm/min, and a span-to-depth ratio between 24 and 32:1. Nominal flexural specimen thickness ranged between 0.19 and 0.27 cm with a specimen width of 1.2 cm and length of 7.4 cm. Short beam shear specimens were tested per a modified version of ASTM-D-2344, employing a span-to-depth ratio of 4:1, and a crosshead speed of 0.127 cm/min. Specimen thicknesses likewise measure between 0.19 and 0.27 cm, while specimen widths were nominally 1.2 cm and 2.5 cm. However, as shown in Table 1, when shear strength of Sample A was measured at 600° it was only one half of its room temperature (68° F.) dry strength. While Sample A may be adequate for many applications, in Aerospace applications where temperature fluctuations for components can vary from −60° F. to 600° F., Sample A would not be acceptable. Analysis of the fracture surfaces of Sample A showed that failure occurred primarily through the carbon fiber/resin interface bond.

In an attempt to achieve an improved interface bond of a composite, a second surface finish of polyimide resin offered by Amoco on T-650/42 carbon fiber and sold under the designation as UC323 was purchased. The carbon fiber with this surface finish was used to make undirectional laminates by compression molding as with Sample A using phenolic triazine resin of the type disclosed in U.S. Pat. No. 4,831,086 as the matrix material to produce a second composite identified as Sample B. This matrix was molded into a desired shape and cured for approximately 1 hour in a platen press having a temperature of 400° F. As shown in Table 1, the flexural strength of Sample B at 600° F., as with Sample A, is only about one half of its initial dry room strength. Analysis of the fracture surfaces of Sample B showed that failure also primarily occurred through the carbon fiber/resin interface bond.

In our investigation to improve the interface bond, we discovered that by using carbon fiber surface finished with a dilute solution of phenolic triazine resin, instead of the commercially available finished such as with Samples A and B, prior to forming into a desired shape or fabric produced composites which retained up to 92% at 500° F. and 62% at 600° F. of its initial flexural and shear strength.

In order to substantiate our discovery, unsized T-650/42 carbon fiber was purchased from Amoco and finished by passing this carbon fiber through through a bath or dip tank at room temperature containing 5–15% by weight of phenolic triazine resin in a methylethylketone solvent. The phenolic triazine was dispersed throughout or impregnated the entire carbon tow to a level of approximately 2% by weight of the carbon fiber. The treated carbon fiber was forced air dried to drive off the residual solvent and to prevent sticking of the carbon which was placed on a spool for storage. Later, the phenolic triazine treated carbon fiber was passed through a second bath containing a solution of from 20–40% of phenolic triazine to create a preimpregnated carbon fiber wherein the weight of between 30–50% of phenolic triazine in the carbon fiber of the preimpregnated carbon fiber. The preimpregnated carbon fiber was molded into flat laminates as per the method used for Samples A and B. Thereafter, the tests used to evaluate Samples A and B were carried out in the same manner on Sample C. The results of these tests, as illustrated in Table 1, indicate that the resulting flexural strength of Sample C at both 500° F. and 600° F. is greatly improved when compared with Samples A and B.

In an attempt to further improve the bond strength of the carbon fiber and phenolic triazine resin matrix, some of the unsized T-650/42 carbon fiber was plasma treated in a system of the type manufactured by Plasma Science, Inc. In this system, the environment of the operational chamber can be changed and for this initial evaluation, the plasma treatment took place in an oxygen atmosphere using several passes through a chamber. A line speed of 22 fpm of the carbon fiber resulting in a one minute residence time in the reactor. A pressure drop from atmospheric pressure to the reactor operating Pressure of 0.3 torr occurs across two transition cells on either side of the reactor. The carbon fibers passes through a set of dies that control air leak and allow transition from one pressure level to another. Since all the reactions take place at a low pressure leakage from the reaction chamber to the surrounding atmosphere are minimized. No change in surface chemical composition was found in the carbon fiber after the plasma treatment. However, the nature of the surface chemical functional groups were different and the wetting characteristic of the carbon fiber was improved.

On exiting from the plasma treatment the carbon fiber was routed through a bath or dip tank containing 5–15% by weight of phenolic triazine resin in a methylethylketone solvent to finish the surface according to this invention. The carbon fiber was forced air dried and later passed through a second bath containing a solution of from 20–40% of phenolic triazine to create a preimpregnated carbon fiber wherein the weight of the phenolic triazine in the carbon fiber is between 30–50% of the preimpregnated carbon fiber and molded into laminates as Sample C to produce Sample D. As shown in Table 1, when the tests set forth for Sample A were performed on Sample D, the flexural strength at 600° F. of Sample D shows an further improvement over Sample A and marked improvement at 500° F. over Sample B.

The atmosphere in the chamber of the plasma system was then changed from oxygen to water. This plasma treated carbon fiber was finished with 5% phenolic triazine according to the invention as in Sample C. Thereafter the fiber was impregnated with phenolic triazine resin and molded into a composite to produce Sample E. As shown in Table 1, the flexural strength of Sample E at 600° F. shows an improvement over the base line Sample A and at 500° F. over Sample B.

The atmosphere in the plasma chamber was then changed from oxygen to argon and the carbon fiber was passed through a chamber where acrylic acid grafting was performed. This plasma treated carbon fiber was given a surface finish of 5% phenolic triazine as performed on Sample C. Thereafter, this fiber was impregnated with phenolic triazine resin and molded into a composite as Sample C to produce Sample F. As shown in Table 1, the flexural strength at 600° F. of Sample F shows a further improvement over the base line Samples A and B and approximately the equivalent of Sample D for the operating range up to 600° F.

FLEXURAL PROPERTIES OF UNAGED CARBON FIBER/PHENOLIC TRIAZINE RESIN UNIDIRECTIONAL LAMINATES

TABLE 1

| Sample | Flexural Strength MPa | | | Flexural Modulus GPa | | |
|---|---|---|---|---|---|---|
| | 68° F. | 500° F. | 600° F. | 68° F. | 500° F. | 600° F. |
| A | 1919 | — | 559 | 152 | — | 152 |
| B | 1444 | 686 | 559 | 175 | 163 | 155 |
| C | 1357 | 885 | 715 | 174 | 160 | 159 |
| D | 1371 | 988 | 824 | 175 | 170 | 166 |
| E | 1417 | 896 | 788 | 179 | 166 | 156 |
| F | 1483 | 922 | 884 | 171 | 167 | 160 |

Some Aerospace components must have the capability to operate in temperature of up to at least 500° F. for extended periods of time. Samples of composites A, B, C, D, E, and F were placed in a chamber having a temperature of 500° F. for a time period of 500 hours and the flexural strength evaluated. As shown in Table 2, the composites Samples C, D, E, and F which were made from carbon fiber that had been treated with phenolic triazine resin retained a greater percentage of the initial strength than either baseline composites Samples A or B.

FLEXURAL PROPERTIES OF CARBON FIBER/PHENOLIC TRIAZINE RESIN UNIDIRECTIONAL LAMINATES AGED 500 HOURS AT 500° F.

TABLE 2

| Sample | 68° F. Test | | 500° F. Test | |
|---|---|---|---|---|
| | Flex. Str. (MPa) | Flex. Mod. (GPa) | Flex. Str. (MPa) | Flex. Mod. (GPa) |
| A | 1840 | 187 | 1264 | 161 |
| B | 1398 | 185 | 871 | 171 |
| C | 1596 | 163 | 1090 | 179 |
| D | 1603 | 190 | 1085 | 186 |
| E | 1655 | 184 | 1052 | 179 |
| F | 1649 | 173 | 1022 | 170 |

The ultimate test of the samples occurred in a shear test which is shown in Table 3. As clearly illustrated, the composites wherein the carbon fiber was treated with phenolic triazine resin retained up to 92% of the dry room temperature strength after being exposed to 500° F. for 500 hours.

SHEAR PROPERTIES OF CARBON FIBER/PHENOLIC TRIAZINE RESIN UNIDIRECTIONAL LAMINATES AGED 500 HOURS AT 500° F.

TABLE 3

| Sample | 68° F. Test S.B.S. Str. (MPa) | 500° F. Test S.B.S. Str. (MPa) |
|---|---|---|
| A | 90.4 | 25.4 |
| B | 77.7 | 43.4 |
| C | 81.2 | 68.4 |
| D | 84.1 | 77.5 |
| E | 72.5 | 70.8 |

TABLE 3-continued

| Sample | 68° F. Test S.B.S. Str. (MPa) | 500° F. Test S.B.S. Str. (MPa) |
|---|---|---|
| F | 88.7 | 69.4 |

We claim:

1. A method of finishing a carbon fiber to promote adhesion of the fiber with a cyanate phenolic matrix, comprising the steps of:
   moving the carbon fiber through a first bath containing a solution of from 5-15% phenolic triazine in a solvent to disperse the phenolic triazine throughout the carbon fibers;
   drying the phenolic triazine treated carbon fiber; and
   moving the treated carbon fiber through a second bath containing a solution of from 20-40% of phenolic triazine to create a preimpregnated carbon fiber wherein the weight of the phenolic triazine in the carbon fiber is between 30-50% of the preimpregnated carbon fiber.

2. The method as recited in claim 1 further including the step of:
   forming said preimpregnated carbon fiber into a desired shape; and
   curing the preimpregnated carbon fiber to form a high strength composite material.

3. The method as recited in claim 1 further including the step of:
   activating said carbon fiber in a plasma chamber Prior to moving the carbon fiber through the first bath to introduce chemical functional and polar groups to promote interfacial bonding with a resin finish.

4. The method as recited in claim 3 further including the step of:
   carrying out the activating of the carbon fiber in the plasma chamber in an oxygen atmosphere.

5. The method as recited in claim 3 further including the step of:
   carrying out the activating of the carbon fiber in the plasma chamber in an argon atmosphere followed by an acrylic acid grafting.

6. The method as recited in claim 3 further including the step of:
   carrying out the activating of the carbon fiber in the plasma chamber in an water atmosphere.

* * * * *